United States Patent [19]

Kirkpatrick

[11] 4,229,232
[45] * Oct. 21, 1980

[54] METHOD INVOLVING PULSED BEAM PROCESSING OF METALLIC AND DIELECTRIC MATERIALS

[75] Inventor: Allen R. Kirkpatrick, Lexington, Mass.

[73] Assignee: Spire Corporation, Bedford, Mass.

[*] Notice: The portion of the term of this patent subsequent to Apr. 24, 1996, has been disclaimed.

[21] Appl. No.: 968,379

[22] Filed: Dec. 11, 1978

Related U.S. Application Data

[60] Continuation-in-part of Ser. No. 780,416, Mar. 23, 1977, Pat. No. 4,151,008, which is a continuation-in-part of Ser. No. 636,055, Nov. 28, 1975, abandoned, which is a division of Ser. No. 524,062, Nov. 15, 1974, Pat. No. 3,950,187.

[51] Int. Cl.$^2$ .................. H01L 21/263; B23K 27/00
[52] U.S. Cl. ...................... 148/1.5; 219/121 L; 250/492 A; 357/91
[58] Field of Search .................. 148/1.5; 357/91; 250/492 A; 427/53; 219/121 L

[56] References Cited

U.S. PATENT DOCUMENTS

| | | | |
|---|---|---|---|
| 3,657,510 | 4/1972 | Rothrock | 219/121 L |
| 3,804,366 | 4/1974 | Lemelson | 117/212 |
| 3,848,104 | 11/1974 | Locke | 219/121 L |
| 3,850,698 | 11/1974 | Mallozzi et al. | 148/4 |
| 3,873,339 | 3/1975 | Hudson | 117/17 |
| 3,900,593 | 8/1975 | Herczog et al. | 427/53 |
| 3,950,187 | 4/1976 | Kirkpatrick | 148/1.5 |
| 3,955,013 | 5/1976 | Kivlighn, Jr. | 427/53 |
| 3,992,164 | 11/1976 | Fengler | 29/196 |
| 4,059,876 | 11/1977 | Ditto | 29/156.7 A |
| 4,087,281 | 5/1978 | Toda et al. | 96/36 |
| 4,087,695 | 5/1978 | Lee et al. | 250/492 B |
| 4,114,985 | 9/1978 | Friedman | 350/266 |
| 4,122,240 | 10/1978 | Banas et al. | 428/655 |

OTHER PUBLICATIONS

Platakis, "Laser-Induced ... Connections ... MOS ...", Jour. Appl. Phys. 47 (1976), 2120.
Chen et al., "Multimode ... by Laser Heating", Appl. Phys. Letts. 29 (1976), 657.
Von Gutfeld, "Crystallization ... Si ... Solar Cell", IBM-TDB, 19 (1977), 3955.

*Primary Examiner*—L. Dewayne Rutledge
*Assistant Examiner*—Upendra Roy
*Attorney, Agent, or Firm*—Morse, Altman, Oates & Bello

[57] ABSTRACT

A pulsed beam generator produces a short duration pulsed beam for thermal processing of selected regions of metallic and dielectric materials. The pulse beam is directed towards the material and irradiates selected surface regions thereof. Energy deposited by the pulsed beam momentarily elevates the temperature of the selected regions for a variety of thermal processing effects. The characteristics of the pulsed beam are such that only those regions on or near the surface are subjected to this thermal processing.

2 Claims, 7 Drawing Figures

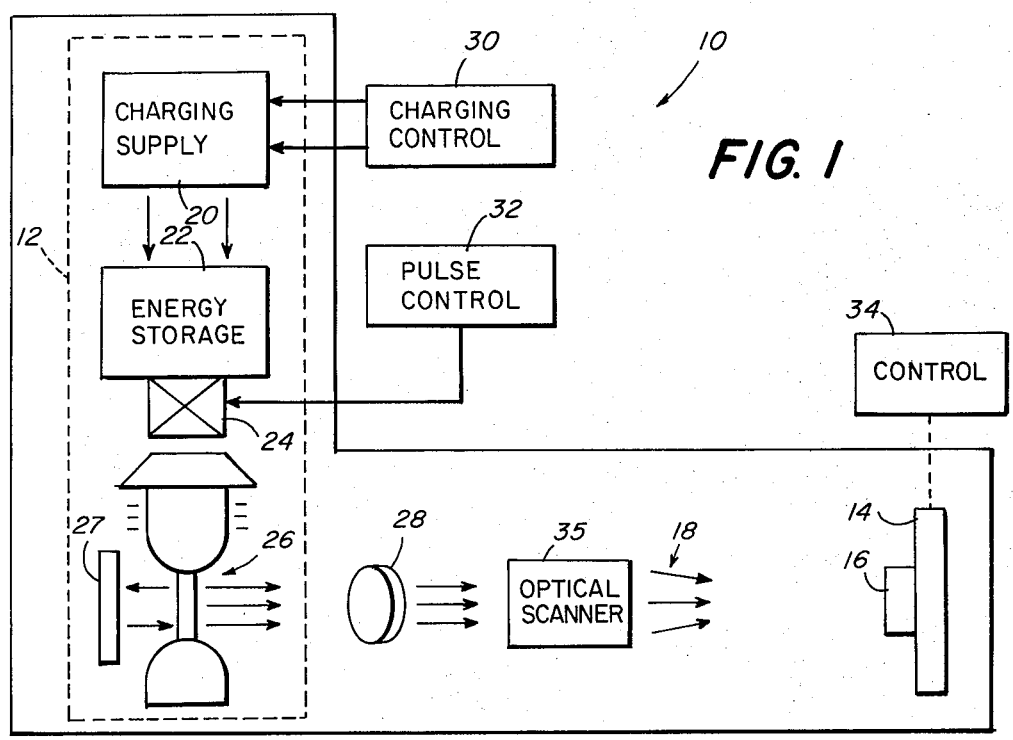
FIG. 1
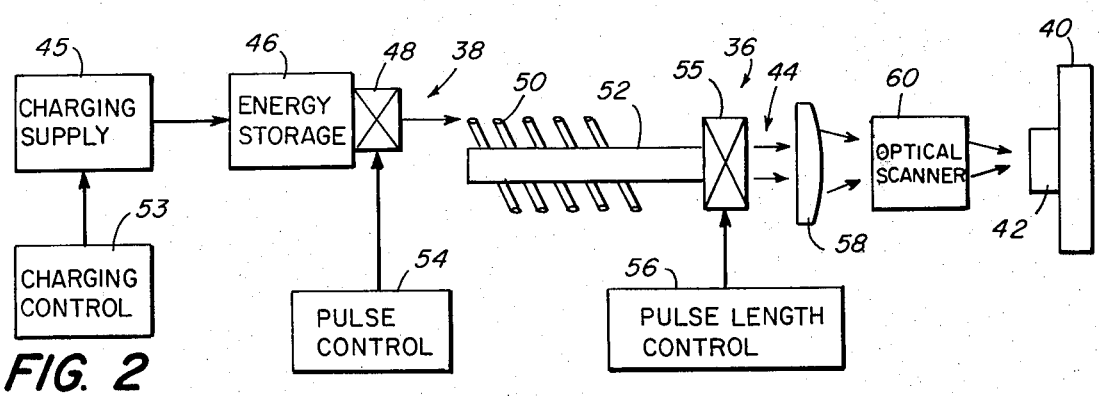
FIG. 2
FIG. 3
FIG. 4
CONTINUOUS SPECTRUM OF XENON FLASH LAMP
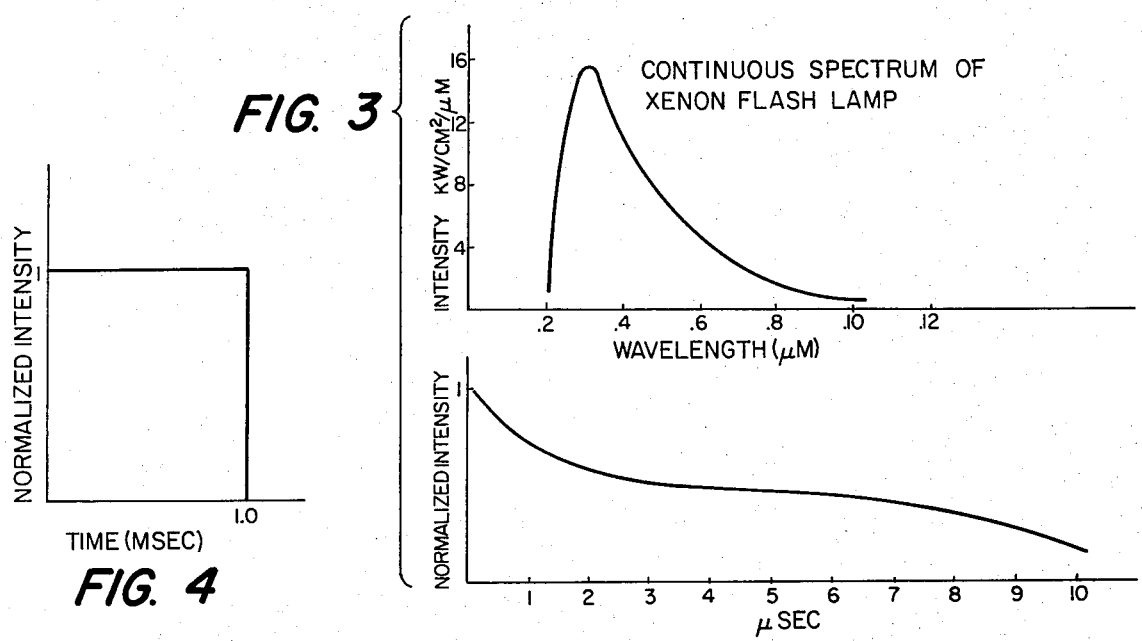

METHOD INVOLVING PULSED BEAM PROCESSING OF METALLIC AND DIELECTRIC MATERIALS

CROSS-REFERENCE TO RELATED APPLICATIONS

This application is a continuation-in-part of Ser. No. 780,416, filed on Mar. 23, 1977, now U.S. Pat. No. 4,151,008, which is a continuation-in-part of Ser. No. 636,055, filed on Nov. 28, 1975, abandoned, which is a division of Ser. No. 524,062, filed on Nov. 15, 1974, now U.S. Pat. No. 3,950,187. A continuation application Ser. No. 791,499, filed on Apr. 27, 1977 of application Ser. No. 636,055 issued as U.S. Pat. No. 4,082,958.

BACKGROUND OF THE INVENTION

1. Field of Invention

The present invention relates to thermal processing of metallic and dielectric materials and, more particularly, is directed towards a method and apparatus involving pulsed beam localized thermal processing of metallic and dielectric materials.

2. Description of the Prior Art

Conventional thermal processing of metallic and dielectric materials is performed by elevating the temperature of the entire material and by maintaining the temperature environment for an adequate period of time to produce the required thermal effects. Consequently, thermal gradients and the rates of heating/cooling are quite small. Generally, thermal processing is performed in a furnace type facility for times ranging from a few seconds to many hours or days over a wide range of temperatures. Such techniques, in addition to being time and energy consuming, have had limited application due to the fact that many materials degrade as a result of the thermal exposures necessary for the processing. A need exists for an improved method and apparatus for rapid thermal processing of specific regions of metallic and dielectric materials that permit controlled thermal processing in a selected region and does not significantly alter other regions of the material.

SUMMARY OF THE INVENTION

A pulsed beam generator produces a pulsed beam (electron beam, coherent light beam or non-coherent light beam) of high intensity for thermal processing of metallic and dielectric materials. The material to be processed is positioned so that the selected regions of the material surface are exposed to the pulsed beam. The selected regions to be processed lie approximately within the characteristic absorption depth of the surface. The pulsed beam processes a region by temperature elevation, thermal gradient, and/or a high rate of heating/cooling to produce the desired effect. Energy deposited by the pulsed beam momentarily elevates the temperature of the selected regions for a variety of thermal processing effects including sintering, annealing of implant damage, electrical activation of impurities, formation of alloy phases, diffusion from a deposited layer, surface texture modification and the like. These and similar effects are associated with high temperatures, high rates of heating and cooling and large thermal gradients. The characteristics of the pulsed beam are such that only those regions on or near the surface are subjected to this processing. Upon completion of the pulse, the temperature profile relaxes back to an equilibrium level with a time constant that is related to geometry and material characteristics. The energy density of the pulsed beam is made sufficiently high, in a controlled manner, to elevate the temperatue without causing deleterious effects such as melting, vaporization, fracturing, and the like. The duration of the pulsed beam is sufficiently short so that substantial temperature elevation occurs only in the vicinity of the surface region of the material being processed and other deeper regions or masked areas of the material are not subjected to undesirable or unnecessary high temperature exposure.

An object of the present invention is to provide a method and apparatus involving pulsed beam thermal processing of specific regions of metallic and dielectric materials without subjecting other regions of the material to excessive thermal exposure.

A further object of the present invention is to provide a method and apparatus involving pulsed beam processing of metallic and dielectric materials in which the temperature elevation, thermal gradient and/or the rate of heating/cooling are momentary in specific regions where the required process effect takes place during the period of parameter elevation.

Other objects of the present invention will in part be obvious and will in part appear hereinafter.

The invention accordingly comprises the methods and apparatuses, together with their parts, steps, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein:

FIG. 1 is a schematic and block diagram of a system embodying the present invention for pulsed flash lamp processing of metallic and dielectric materials;

FIG. 2 is a schematic and block diagram of an alternate embodiment for pulsed laser processing of metallic and dielectric materials;

FIG. 3 is a graphical representation of photon spectrum and intensity versus time characteristics of an ultra-violet flash lamp pulse for use in ion implantation damage annealing;

FIG. 4 is a graphical representation of the intensity versus time of a neodymium yag laser pulse for use in ion implantation damage annealing;

DETAILED DESCRIPTION OF THE PREFERRED EMBODIMENTS

Figure 5:
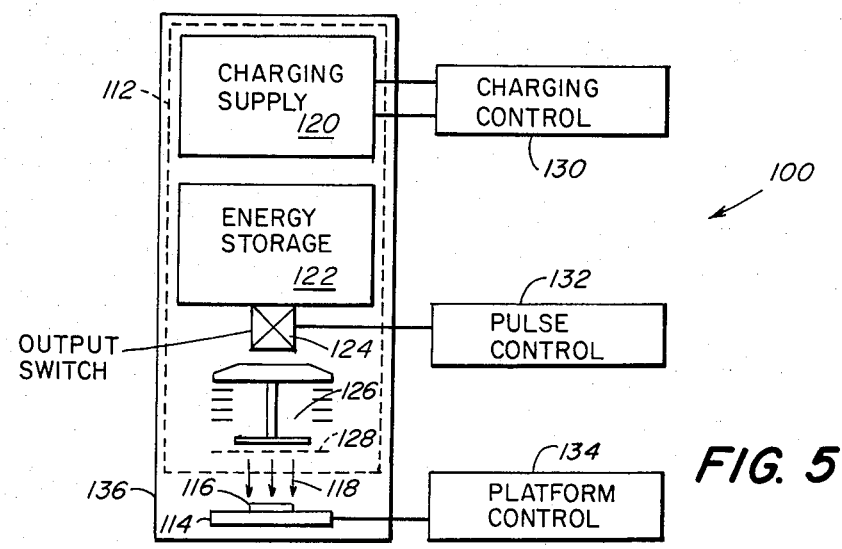
FIG. 5 is a schematic and block diagram of a system embodying the present invention for pulsed electron beam processing of metallic and dielectric materials.

The present invention provides a method and apparatus for localized thermal processing of specific regions of metallic and dielectric materials by momentarily elevating the temperature, thermal gradient and heating/cooling rate of the surface region. Thermal processing includes mechanical annealing, annealing and electrical activation of ion implanted material, annealing of ion induced radiation damage, sintering for electrical or mechanical characteristic improvement, short range atomic diffusion in the material, formation of arbitrary alloy phases, surface texture modification, and the like. A short duration pulsed beam generated by, for example, an electron beam generator, a laser or flash lamp, is directed towards specific surface regions of the metallic or dielectric material to be processed. The short duration pulse impacts upon the surface region, the pulsed electrons or photons incident upon the surface being absorbed as they penetrate the material, and the deposited energy momentarily elevates the thermal process parameters in the vicinity of the impacted region. The desired thermal effect occurs when the temperature in the region to be processed exceeds specified threshold levels, the threshold levels being related to the particular process effect desired and the specific material involved.

The parameters that are variable in the pulsed beam processing are: (1) the energy spectrum of the pulsed beam; (2) the duration of the pulses; (3) the total energy per unit area carried to the material surface by the electron beam or photons per pulse; and (4) the total number of pulses employed. The energy spectrum, intensity and pulse width are selected so that specific process parameters in the entire region to be processed are raised above minimum process effect levels. Duration of the pulse is sufficiently short so that the deposited energy is not dissipated from the process region during the pulse period, whereby minimum processing temperatures are not presented throughout the region. The total energy deposited per unit area on the metallic or dielectric material by the pulse is determined from consideration of the requirements for achieving minimum thermal processing parameters throughout the implanted region without exceeding thresholds for energy-induced structural damage mechanisms such as vaporization, fracturing, and the like, anywhere in the material. It has been found that single pulses are adequate for annealing particular ion implantation conditions in specific materials, however, multiple pulses are necessary for completion of other pulsed processes under certain conditions.

Pulsed electrons and photons incident upon the material surface are absorbed as they penetrate the material. The energy of the electrons and photons is converted to heat in the absorbing material, the heating effect being spatially dependent upon rate and position at which the energy is absorbed. The momentary temperature elevation in a region extending from the material surface through an arbitrary selected depth is controlled by varying the pulsed beam parameters. The use of the pulsed beam for processing of metallic and dielectric materials provides localization of thermal treatment at the necessary region, the treatment being performed in time durations of the order of $10^{-1}$ second or less. Temperatures achieved depend upon the material and the deposited energy density, and are controlled by selection of the characteristics of the electron or light pulse. At completion of the pulse period and the achievement of peak temperature, the temperature profile relaxes back to an equilibrium level with a time constant which depends upon geometry and material characteristics.

Referring now to the drawings, particularly FIG. 1, there is shown a system 10 for thermal processing of metallic and dielectric materials. System 10 comprises a pulsed light source 12 and a platform 14 on which there is mounted a specimen 16 composed of a metallic or dielectric material. A non-coherent light source 12, for example a flash tube, generates a short duration pulse 18 that is directed towards specimen 16 for localized thermal processing of specific regions thereof, for example, the surface regions. Light source 12 includes a charging supply 20, an energy storage unit 22, an output switch 24, a high pressure discharge tube 26, a reflector 27, such as a mirror, and light focusing optics 28. Charging supply 20 is connected to a charging control 30 which controls the energy spectrum and light intensity. A pulse control 32, which is connected to switch 24, triggers an electrical pulse that is discharged through tube 26. Focusing optics 28 direct the light to specimen 16 on platform 14. Pulse duration is regulated by internal configuration of energy storage unit 22 and flash tube geometry and gas pressure. Energy density at the surface of the specimen 16 is controlled by the focusing optics 28 and the specimen. Specimen 16 is carried by platform 14, for example an XY table, that is movable by means of a controller 34 for proper alignment of specimen 16 with respect to light beam 18. Specimen 16 is positioned so that light beam 18 irradiates the surface being processed. In alternative embodiments, light beam 18 is scanned over the surface of specimen 16 with an optical scanning apparatus 35 rather than positioning the specimen by means of platform 14. The distance between optics 28 and the surface of specimen 16 is in the approximate range of 0 to 1 meter depending upon focal length. By way of example, the approximate ranges of light pulse parameters:

Pulse Duration     $10^{-9}$–$10^{-1}$ second
Photon Energy      0.1–10 ev
Light Density      $10^{-3}$–$10^{3}$ cal/cm$^2$ The impacting light pulse momentarily elevates the temperature of the surface of specimen 16 in the region to be processed without subjecting the other portions of the specimen to undesirable and unwanted thermal exposure.

In an alternative embodiment of FIG. 2, there is shown a system 36 for thermal processing of metallic and dielectric materials comprising a pulsed light source 38 and a platform 40 on which there is mounted a specimen composed of a metallic or dielectric material. Light source 38 generates a short duration pulse 44 that is directed towards specimen 42 for localized thermal processing of specific regions of the specimen, for example, the surface regions. Light source 38 includes a charging supply 45, an energy storage unit 46, an output switch 48, a flash lamp 50 and a laser assembly 52. Charging supply 45 is controlled by a charging control 53. Output switch 48 and a pulse control 54 energize flash lamp 50, whereby laser assembly 52 emits coherent pulsed light beam 44. The pulse length of light beam 44 is determined by a Q-switch 55 and a controller 56. The generated light beam is focused by optics 58 and a scanner 60 onto specimen 42 in the manner described in connection with system 10. The approximate ranges of the parameters for light beam 44 are:

Pulse Duration     $10^{-9}$–$10^{-1}$ second
Photon Energy      0.1–6 ev
Light Intensity    $10^{-3}$–$10^{3}$ cal/cm$^3$ FIG. 3 is a graphical representation of the experimentally measured photon spectrum and intensity versus time characteristics of one of a 0.3 cal/cm$^2$ ultraviolet flash lamp pulses for system 10 and described above. FIG. 4 is a comparable graphical representation for the neodymium yag pulsed laser source. The pulsed light processing of systems 10 and 36 provides extremely rapid thermal processing of the metallic and dielectric materials, high temperatures being maintained in the processed region for time periods of the order of microseconds or milliseconds until thermal relaxation has occurred after completion of the pulse. In consequence of the high temperatures being produced in only a limited region for only a short period of time, higher peak temperature utilization is more efficient than in conventional thermal processing techniques. In consequence, better effects are achieved.

Referring now to FIG. 5, there is shown an electron beam thermal processing system 100 comprising an electron beam generator 112 and a platform 114 in an electron beam chamber 136. A specimen 116 to be processed is mounted on platform 114 within chamber 136. Electron beam generator 112 generates a short duration pulsed electron beam 118 that is directed towards specimen 116 for localized thermal processing of specific regions. Electron beam generator 112 includes a charging supply 120, an energy storage unit 122, an output switch 124, a cathode diode unit 126 and a transparent anode 128. Charging supply 120 is connected to a charging control 130, which controls the energy spectrum of the electron pulse. Pulse control 132, which is connected to output switch 124, triggers the electron pulse that is directed from cathode 126 to specimen 116 on platform 114 through anode 128. Pulse duration is regulated by internal configuration of energy storage unit 122. Energy density at the surface of specimen 116 is controlled by the geometry of cathode 126, anode 128 and the specimen. Specimen 116 is carried by platform 114, for example, an XY table, that is movable by means of a controller 134 for proper positioning of specimen 116 with respect to electron beam 118. Specimen 116, which is composed of a metallic or dielectric material, is positioned in such a manner that electron beam 118 impacts upon the surface being processed. The distance between anode 128 and the surface of specimen 116 is in the approximate range of 0 to 1 meter. Electron beam chamber 112 is evacuated to a pressure consistent with the requirements for generation and propagation of the electron pulse, for example, a vacuum level in the range $10^{-3}$ to $10^{-6}$ torr. By way of example, the ranges of electron pulse parameters are:

Pulse Duration $10^{-9}$–$10^{-1}$ second
Electron Energy $10^3$–$10^6$ eV
Electron Fluence $10^{-3}$–$10^2$ cal/cm$^2$
Beam Current 1–$10^4$ amp/cm$^2$ The impacting electron beam pulse momentarily elevates the temperature of the surface of specimen 116 in the region to be processed without subjecting other portions of the specimen to undesirable and unwanted thermal exposure.

Figure 6:
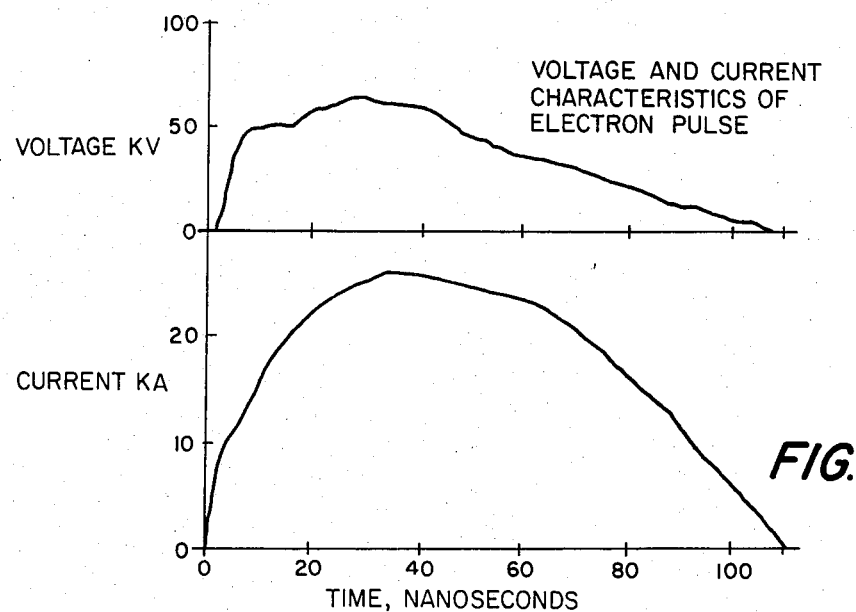
FIG. 6 is a graphical representation of voltage and current versus time characteristics of a particular electron pulse used in one ion implantation damage annealing demonstration.
Figure 7:
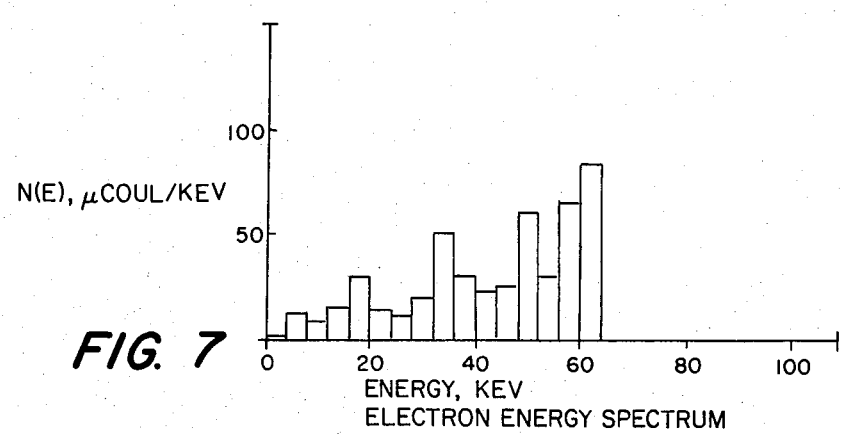
FIG. 7 is a graphical representation of the electron energy spectrum determined for the electron pulse characteristics of FIG. 6.

FIG. 6 is a graphical representation of the experimentally measured current and voltage versus time characteristics of one of the 0.6 cal/cm$^2$ electron pulses and FIG. 7 is a graphical representation of the electron energy spectrum of the electron pulse represented in FIG. 6. The pulsed electron beam processing of system 100 provides extremely rapid thermal processing of the metallic or dielectric material, high temperatures being maintained in the processed region for time periods as short as microseconds or milliseconds until thermal relaxation has occurred after completion of the electron pulse. In consequence of the high temperatures being produced in only a limited region for only a short period of time, higher peak temperatures utilization is more efficient than in conventional processing techniques. In consequence, better effects are achieved. Specific applications of the pulsed electron beam processing of metals and dielectrics utilizing the teachings of the present invention include polishing, glazing and alloying.

An improved surface finish produced by mechanical and chemical polishing techniques is realized by melting a thin surface layer which is oriented horizontally and by allowing plastic flow of the material to smooth any surface irregularities. Pulse beam heating avoids distortion of the macroscopic or the microscopic (i.e., crystal) structure which would occur if the bulk of the material being processed is exposed to the elevated temperatures required for melting. Specific examples of polishing include the polishing of quartz crystals for use as pressure transducers and polishing metal coatings on materials with lower melting temperature than that of metal.

In the case of glazing, pulsed heating and rapid quenching of the surface of alloys or segregated compound metals, first produce a homogeneous liquid and then, an amorphous homogeneous solid. The resulting surface layer has a composition which exceeds the solubility limit provided by slow cooling from the melt where segregation occurs. Examples of compound metals which exhibit a 10 to 100% increase in hardness after pulsed surface heating are: Fe-Si, Au-Cu-Si, Cu-Co-Si, Pd-Cu-Si, Co-Ta-C, and M50 bearing alloy. The amorphization of compounds beyond stable solid phases can also be used to create new superconducting materials.

An alloy is formed on a substrate by utilizing the pulsed beam processing techniques herein described to drive-in a surface dopant which is deposited initially as a thin film or is ion implanted. The pulsed beam heating causes the surface dopant to diffuse inwardly. In one example, Ta is implanted into M50 bearing alloy to increase surface hardness. In another example, Ta or Ag is implanted into single crystal Cu or is deposited as a thin 200 Å film on Cu to change the surface electrical properties. In the latter example, pulsed heating of the surface of a high quality single crystal causes expitaxial regrowth of the surface with good crystal structure and the dopant occupies substitutional positions in the lattice.

In other applications of the invention, the grain boundary structure of tin oxide is removed at the surface by pulsed heating amorphization of the structure; the chemical composition of pulsed electron beam heated metal or insulating surfaces is changed by heating in a gaseous atmosphere containing the desired additive; and desorption of absorbed gases on surfaces accomplished faster with pulsed electron beam heating under high vacuum ($10^{-7}$ torr or lower) than by gradual baking.

Since certain changes may be made in the foregoing disclosure without departing from the scope of the invention herein involved, it is intended that all matter contained in the above description and shown in the accompanying drawings be construed in an illustrative and not in a limiting sense.

What is claimed is:

1. A method for localized thermal processing of a selected surface region of a specimen composed of a metallic or dielectric material comprising the steps of:
   (a) generating a short duration, noncoherent pulsed light;

(b) directing said short duration pulsed light at the selected surface region of the specimen, said short duration pulsed light beam interacting with said selected surface region; and
(c) momentarily elevating temperature only in a vicinity of the selected region by impacting said short duration, noncoherent light pulse upon the selected surface region.

2. The method as claimed in claim 1 wherein the pulse duration of said short duration, pulsed light is in the range of $10^{-9}$ to $10^{-1}$ second.

* * * * *